US006417866B1

(12) United States Patent
Man et al.

(10) Patent No.: US 6,417,866 B1
(45) Date of Patent: *Jul. 9, 2002

(54) METHOD AND APPARATUS FOR IMAGE DISPLAY PROCESSING THAT REDUCES CPU IMAGE SCALING PROCESSING

(75) Inventors: Albert T. C. Man, Scarborough; Adrian Muntianu, Toronto, both of (CA)

(73) Assignee: ATI Technologies, Inc., Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,935

(22) Filed: Feb. 26, 1997

(51) Int. Cl.[7] ................................................. G09G 5/26
(52) U.S. Cl. ...................... 345/660; 345/671; 345/629
(58) Field of Search ................................. 345/127, 128, 345/129, 130, 131, 439, 521, 507, 509, 629, 633, 635, 660, 670, 671, 698; 395/102

(56) References Cited

U.S. PATENT DOCUMENTS

| 4,751,507 A | | 6/1988 | Hama et al. | |
|---|---|---|---|---|
| 4,774,678 A | * | 9/1988 | David et al. | 345/439 |
| 4,893,258 A | * | 1/1990 | Sakuragi | 345/439 |
| 5,638,523 A | * | 6/1997 | Mullet et al. | 345/326 |
| 5,689,287 A | * | 11/1997 | Mackinlay et al. | 345/427 |
| 5,784,047 A | * | 7/1998 | Cahill, III et al. | 345/127 |
| 5,812,144 A | * | 9/1998 | Potu et al. | 345/439 |
| 5,838,296 A | * | 11/1998 | Butler et al. | 345/127 |
| 5,838,334 A | * | 11/1998 | Dye | 345/503 |
| 5,838,336 A | * | 11/1998 | Ross | 345/508 |
| 5,864,347 A | * | 1/1999 | Inoue | 345/516 |
| 6,014,125 A | * | 1/2000 | Herbert | 345/127 |
| 6,184,859 B1 | * | 2/2001 | Kojima | 345/130 |

* cited by examiner

Primary Examiner—Steven Saras
Assistant Examiner—Amr Awad
(74) Attorney, Agent, or Firm—Vedder, Price, Kaufman & Kammholz

(57) ABSTRACT

From a display memory, an image scaler retrieves display data representing an image, and produces a data stream representing a scaled version of the image. Based on the data stream, a digital-to-analog converter produces display signals suitable for displaying the scaled version on as a full-screen image on a display screen. Optionally, the scaled version is displayed in a window on the display screen. Characteristics of the scaled version are based on input signals intercepted from a keyboard and a pointing device by an input interception program. For a pointer displayed on the display screen for the pointing device, logical and visual pointer positions are determined based on the input signals and the characteristics of the scaled version.

11 Claims, 11 Drawing Sheets

METHOD AND APPARATUS FOR IMAGE DISPLAY PROCESSING THAT REDUCES CPU IMAGE SCALING PROCESSING

BACKGROUND OF THE INVENTION

The invention relates to displaying images.

A typical computer system has a display screen based on cathode-ray tube technology or liquid-crystal display technology and driven by display signals generated by the computer system. The display screen consists of multiple discrete display elements called "pixels", organized in industry-standard combinations of columns and rows, such as 800 columns and 600 rows, or 1024 columns and 768 rows.

What appears on the display screen is controlled by a display memory provided by the computer system. Color information for each display element is stored in the display memory. The size of the display memory defines the number of different colors able to be specified for each display element. For example, if the display memory allocates 4 bits per display element (known as a "color depth" of 4), any one of sixteen different colors may be specified for each display element. Other common color depths are 8, 15, 16, and 24, allowing the specification of any one of 256, 32768, 65536, and 16777216 colors, respectively. In some cases, a color depth of 32 is used to allow the specification of not only any one of 16777216 colors but also other information such as 8-bit alpha channel information to facilitate composite layering and other effects.

The display signals that drive the display screen are derived from the display memory's color information, typically by a display screen controller provided by the computer system.

Enlarging an image on the display screen is accomplished by software (such as drawing or painting software) running on the computer system. For example, the Opainting software may allow an end-user of the computer system to display a photograph on the display screen. In such a case, the painting software may also allow the end-user to cause a portion of the photograph to be enlarged on the display screen. To do so, the end-user selects the portion with a pointing device and then uses the pointing device or a keyboard to issue an "enlarge image" command to the painting software. The painting software then "re-draws" the selected portion in a larger size, by causing changes to the contents of the display memory. For instance, if the photograph includes an image of an eye, and the end-user selects the eye image for enlargement, the painting software causes more of the display memory to be used for displaying the eye image. In such a case, if the eye image originally used a display memory portion corresponding to 7500 display elements (i.e., 75 rows of 100 display elements each), the enlarged eye image uses a larger display memory portion corresponding to, e.g., 30,000 display elements (i.e., 150 rows of 200 display elements each). Subsequently returning the eye image to its original size requires more changes to the display memory.

Because the painting software is running on the computer system, the changes to the display memory involve processing by the computer system's main processor (which may include two or more processor units executing in parallel). Typically, the computer system's main processor is also used for performing other tasks in the computer system, such as saving and loading computer files, calculating numbers, and performing operating system functions. Consequently, depending on whether the main processor is busy performing one or more of the other tasks, the changes to the display memory may not be performed in real-time. For instance, the end-user may expect the image to be enlarged to be updated 30 times per second (e.g., to produce the effect of fluid motion). In such a case, the main processor may be too burdened by the other tasks to be able to keep up, and may be able to cause enlarged images to be produced at a rate of only 20 times per second, for example.

SUMMARY OF THE INVENTION

The invention provides a method and a device for use in displaying a scaled version of an image on a display screen of a computer system. Special-purpose display circuitry, specifically an image scaler, is provided. The image scaler allows the scaled version to be produced without burdening a main processor of the computer system. Because production of the scaled version is hardware-based, the scaled version can be displayed on the display screen (and subsequently can be removed) nearly instantaneously at the direction of an end-user of the computer system. Consequently, the scaled version can be updated in real-time as the image is updated, such as when the image is updated 30 times per second to produce a full-motion effect.

In addition, input from the end-user is intercepted to allow characteristics of the scaled version (such as the scaled version's position) to be based on the input. Consequently, for example, the image to be scaled can be selected in response to movement of a pointing device by the end-user. Intercepting the input allows the scaled version to operate as an end-user-maneuverable "magnifying glass" atop the display screen, i.e., as an enlargement of a portion of a visual display on the display screen, where the enlargement is provided in a window that moves and is updated correspondingly in response to input from the pointing device.

The invention features storing in a display memory, original image data representing an original version of the image, and, based on the original image data and an image scaler, producing a data stream representing a scaled version of the image, while leaving at least a portion of the original image data intact.

Implementations of the invention may include one or more of the following features. The data stream may be updated in real-time to take into account changes made to the original image data. The scaled version of the image may be an enlarged version, a reduced version, or a full-screen version of the image.

Based on the data stream, a display signal may be generated for displaying the scaled image in a window on the display screen. The display signal may be configured to allow the window to obscure the original version of the image.

Based on the original image data, another data stream may be produced. This other data stream may represent the original version of the image. Based on the two data streams, a display signal may be generated for displaying the scaled image in a window on the display screen. The two data streams may be switched between while the display signal is generated. The switching may be based on the contents of at least one of the streams or on an arithmetic logic unit.

The data stream may reflect a horizontal scaling factor that is different from a vertical scaling factor. The original image data may include color information for the image, and the data stream may include duplicates of a piece of the color information.

Input signals to the computer system may be intercepted, and the data stream may be based on the input signals. Initiating production of the data stream may be based the input signals.

The method may also include determining a pointer position for a pointer of a pointing device and basing the data stream on the pointer position. The pointer position may be mapped to a logical pointer position corresponding to the original image data.

A display signal generator (such as a digital-to-analog converter) may be connected to use the data stream to produce a signal for displaying the scaled version on the display screen. A multiplexor may be connected to pass the data stream to the display signal generator, and may be connected to switch between passing the data stream and another data stream representing the original version. An arithmetic logic unit may be connected to affect the passing of the data stream to the display signal generator. A Peripheral Component Interconnect ("PCI") or Industry Standard Architecture ("ISA") plug-in card may include the image scaler.

DESCRIPTION OF THE PREFERRED EMBODIMENTS

Figure 1:
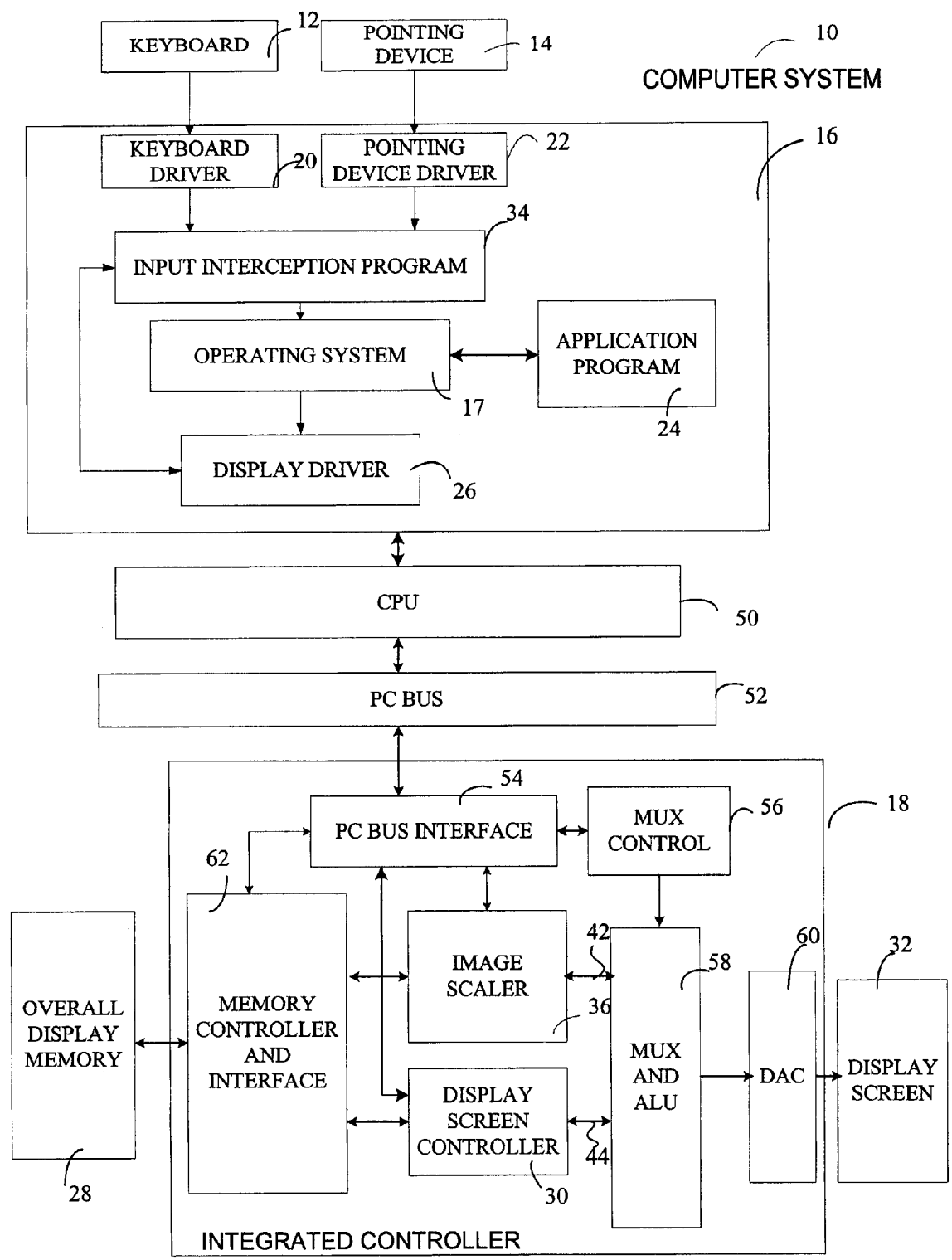
FIG. 1 is a block diagram of a computer system including an image scaler.

FIG. 1 illustrates a computer system 10 having a keyboard 12 and a pointing device 14 (such as a computer mouse) to allow an end-user to provide input such as computer commands to the computer system. The computer system has a main processor ("CPU") 50 (such as an Intel® Pentium® processor) that runs software 16 including an operating system (i.e., operating environment software) 17 such as Microsoft® Windows® NT, Microsoft® Windows®95, UNIX®, OS/2®, or Java™. The CPU communicates across a computer bus ("PC bus") 52 with an integrated controller 18 that has a PC bus interface 54. The computer bus conforms to a standard such as Industry Standard Architecture ("ISA") or Peripheral Component Interconnect ("PCI"). As described below, to display information to the end-user, the integrated controller makes use of an overall display memory 28 to control a display screen 32 such as a computer monitor based on cathode-ray tube technology or liquid crystal technology.

Normally, input signals from the keyboard and the pointing device are detected by the software, specifically, by a keyboard driver 20 and a pointing device driver 22, respectively. The detected input signals are interpreted by the operating system and by an application program 24 such as a word-processing program or a graphics or painting program. As a result of the input signals, the operating system or the application program may need to cause an update to display information stored by the overall display memory. If so, the operating system directs a display driver 26 to communicate with the integrated controller which employs a memory controller and interface subsystem 62 to update the overall display memory. The integrated controller also includes a digital-to-analog converter ("DAC") 60 which generates display signals based on the display information to create a visual display on the display screen.

Figure 2:
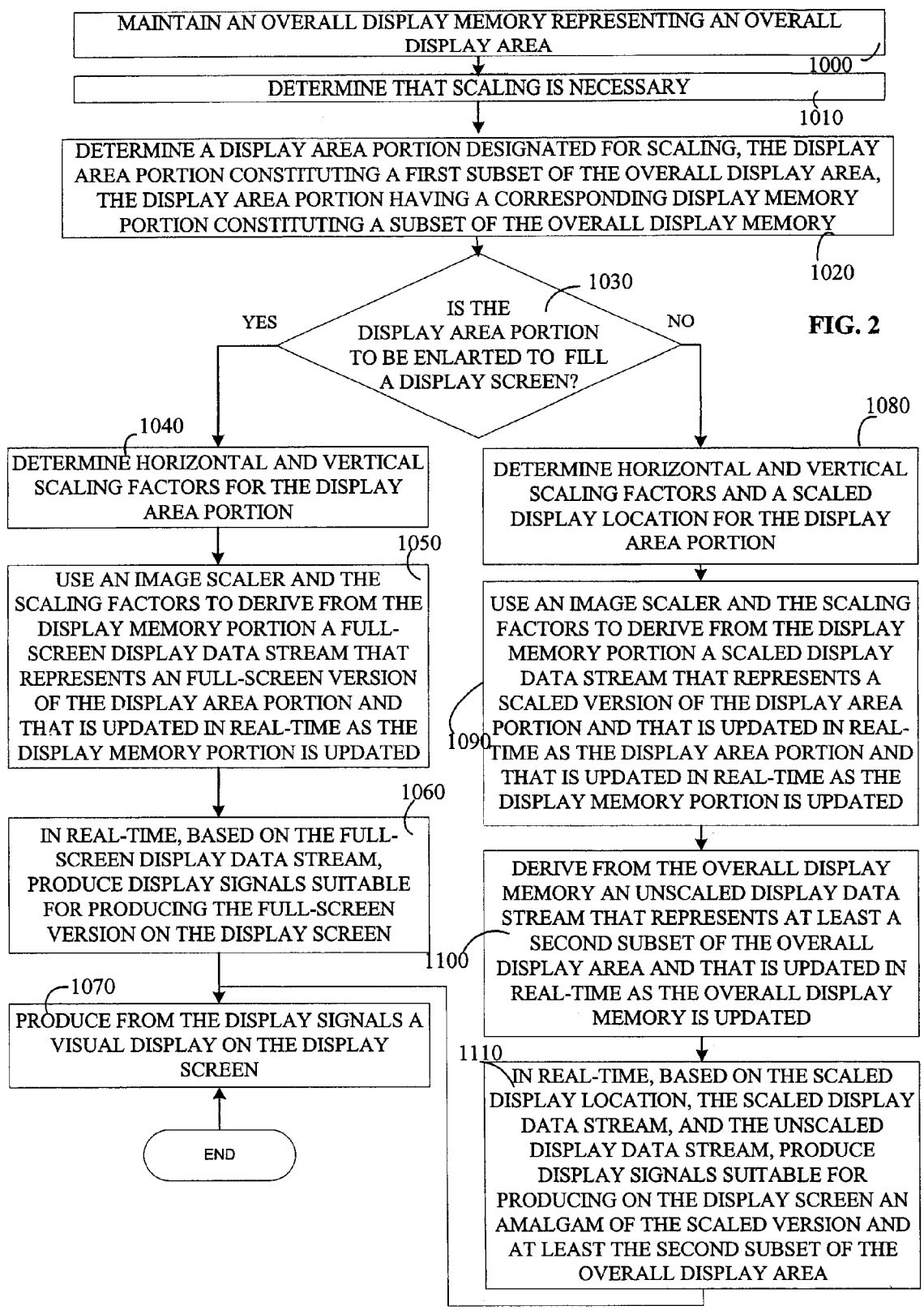
FIGS. 2, 9 and 10 are flow diagrams of logic followed by the computer system of FIG. 1.

The software also includes an input interception program 34 and the integrated controller also includes an image scaler 36, a multiplexor unit (which includes an Arithmetic Logic Unit ("ALU")) 58 and multiplexor control logic 56, all of which are used in a procedure (illustrated in FIG. 2) for scaling (i.e., changing the size of) an image on the display screen. In the procedure, the overall display memory is maintained for representing an overall display area which is a logical two-dimensional space used for displaying images (step 1000). The overall display memory is organized to correspond with the organization of the display screen.

Figure 3:
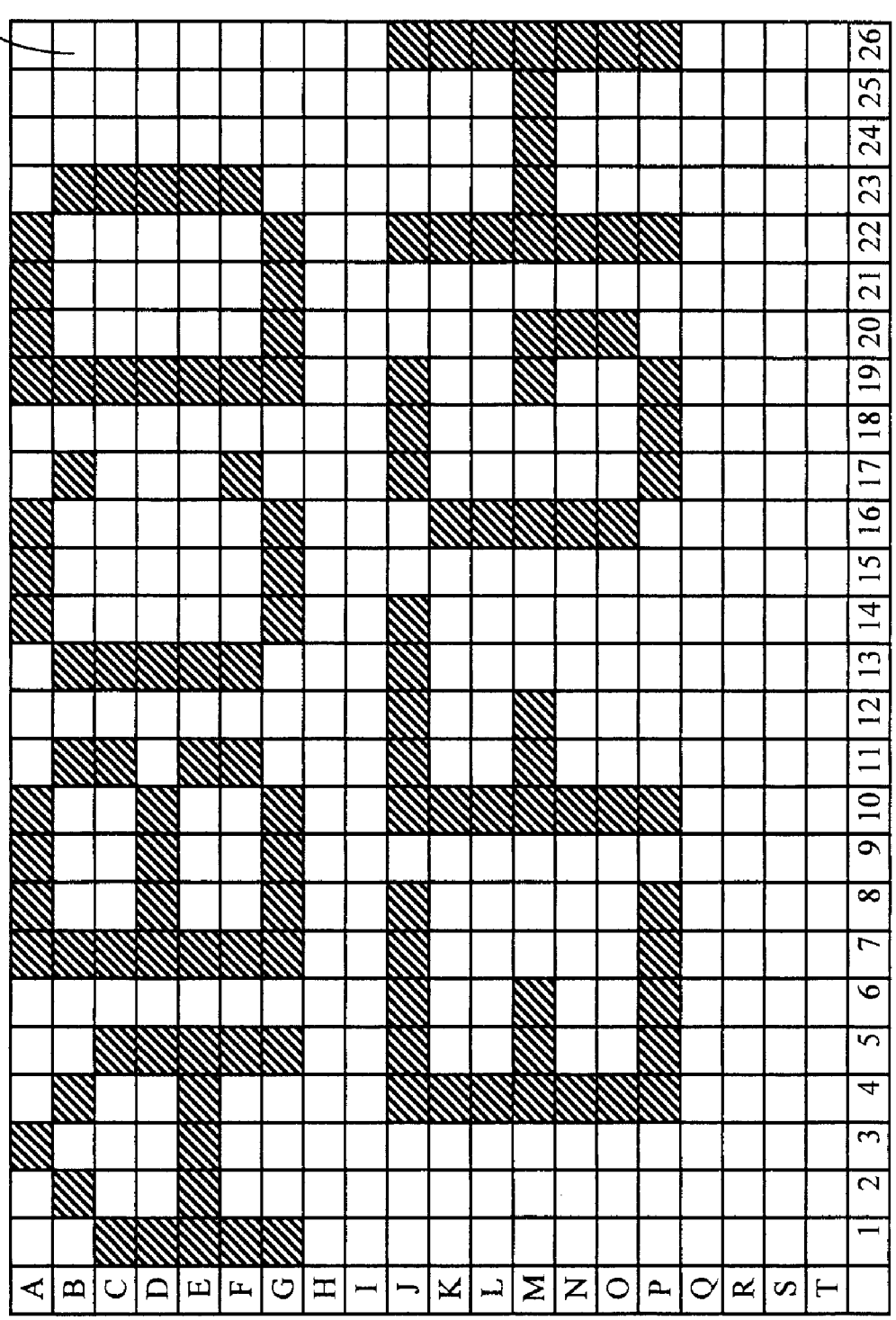
FIGS. 3, 6–8, and 11 are diagrams of a display screen of the computer system of FIG. 1.

FIG. 3 shows a simple example in which the display screen has 520 display elements organized in 20 rows (Row A through Row T) and 26 columns (Column 1 through Column 26). The display information stored by the overall display memory represents a visual display having one or more images, here exemplified by the capital letters "A" through "H". For example, the image for letter "A" is displayed on the display screen by display elements A1/A5/G1/G5 (signifying all of the display elements within a square having display elements A1, A5, G1, and G5 at the corners, i.e., display elements A1 through A5, B1 through B5, C1 through C5, D1 through D5, E1 through E5, F1 through F5, and G1 through G5). Each of the display elements A1/A5/G1/G5 corresponds to one or more memory elements in the overall display memory. Each memory element stores color information. For example, for the display element A2, one of the memory elements stores color information (such as a number 0) indicating that display element A2 has a background color (here, white) of the overall display area. Conversely, another one of the memory elements stores color information (such as a number 1) indicating that display element A3 has a text color (here, black) of the overall display area.

The display driver determines that scaling of an image is necessary (step 1010). Such a determination may occur as a result of any of a number of factors, including input signals and others to be described. In the case of input signals, the input interception program is used. The input interception program intercepts input signals from the keyboard (and also from the pointing device, to be described). Usually, when the end-user presses a key or a combination of keys on the keyboard, the input interception program passes the resulting input signals directly on to the operating system, and takes no other action. However, when a predetermined combination of keys has been pressed, the input interception program determines that scaling of an image is necessary, and communicates the determination to the display driver.

Figure 4:
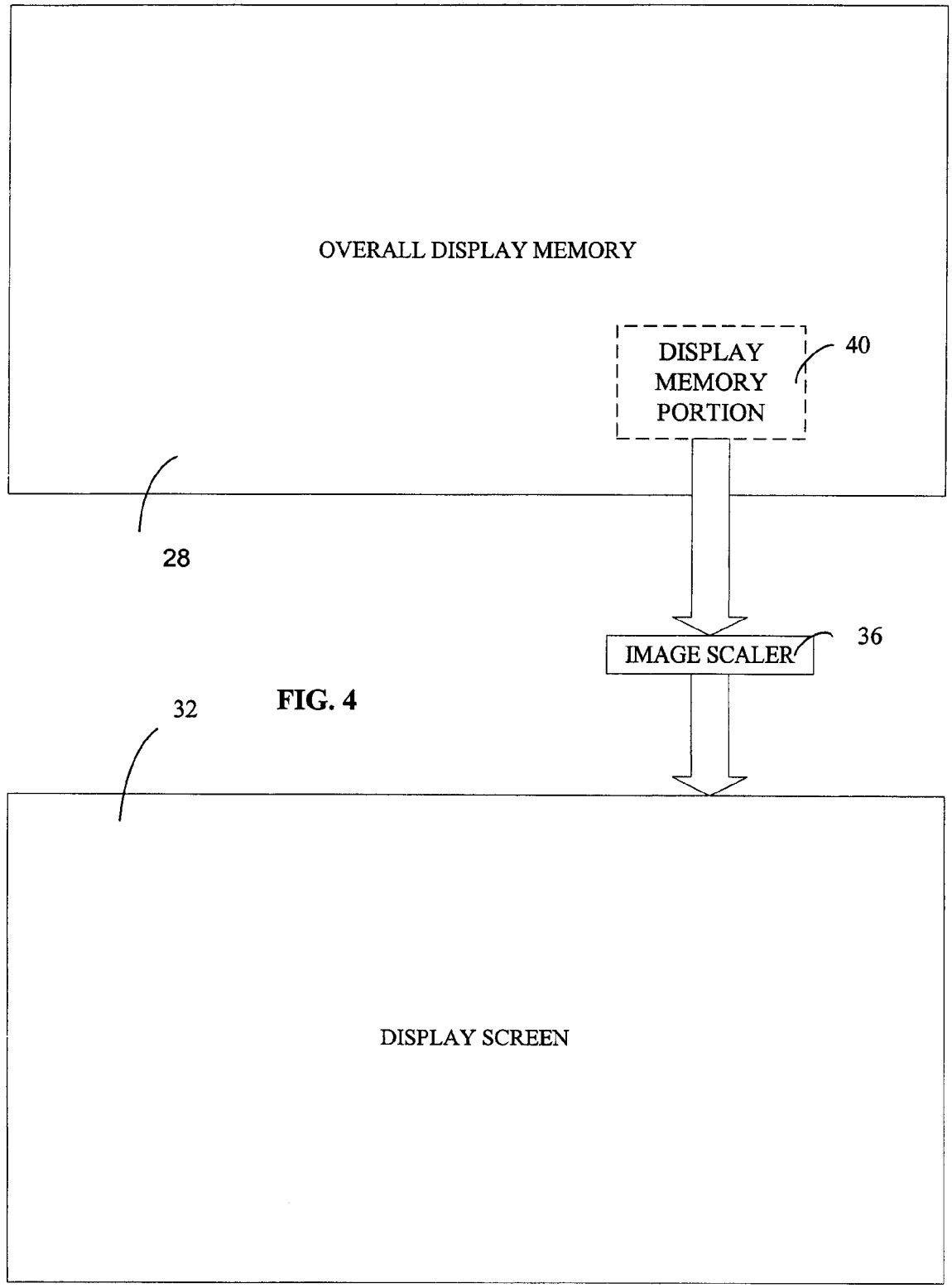
FIGS. 4 and 5 are block diagrams helpful for understanding the logic of FIGS. 2, 9, and 10.

The display driver then determines a display area portion designated for scaling (step 1020). The display area portion constitutes a subset of the overall display area and has a corresponding display memory portion 40 (FIG. 4) that constitutes a subset of the overall display memory. The display area portion may be determined in any of a number of ways, including by pointer position and other ways to be described. In the case of pointer position, the display area portion is determined by a pointer (to be described in more detail) displayed for the pointing device on the display screen. For example, if the pointer is positioned at display element M6 (FIG. 3), the display area portion may correspond to the display elements for the capital letter "E" image, i.e., display elements J4/J8/P4/P8.

The display driver then determines whether the display area portion is to be enlarged to fill the display screen (step 1030). If the scaling procedure started with the pressing of a predetermined combination of keys, the predetermined combination may specify whether the display area portion is to fill the display screen. For example, if the predetermined combination includes the "control" key, the "alt" key, and the "F9" key, the display driver determines that the display area portion is to fill the display screen. On the other hand, if the predetermined combination includes the "control" key, the "alt" key, and the "F10" key, the display driver may determine that other action, to be described, is to take place.

If the display area portion is to fill the display screen, the display driver then determines horizontal and vertical scaling factors for the display area portion (step 1040). The scaling factors may originate in any of a number of ways, including by pre-selection by the end-user (for example, based on the number of times the end-user presses the predetermined combination of keys) and by the device driver (for example, based on the number of display elements available in the display screen). Neither scaling factor need be an integer, and the horizontal scaling factor need not be the same as the vertical scaling factor.

The image scaler and the scaling factors are used to derive from the display memory portion a full-screen display data stream 42 (FIG. 1) (step 1050). The image scaler reads color information from the memory elements of the display memory portion and creates a display data stream such as the full-screen display data stream. The image scaler does not change the contents of the overall display memory, including the display memory portion. Color information in the created display stream is derived (e.g., by interpolation as described below) from the color information in the display. memory portion so that the display memory portion is able to represent a different number of display elements. In cases where at least one of the scaling factors is an integer, the created display data stream may include duplicates of (in the case of image enlargement) or may leave out (in the case of image reduction) at least some of the color information in the display memory portion.

The image quality of the scaled image may be improved by a dithering/blending function of the image scaler. For instance, in the display area portion, a display element Alpha may be adjacent to another display element Beta in the same row. In addition, the horizontal scaling factor may be 1.5 to cause a horizontal image enlargement from these two display elements to three display elements (Alpha, Beta, and a new "middle" display element between display elements Alpha and Beta). In such a case, if display elements Alpha and Beta have colors "blue" and "red", respectively, the dithering/blending function causes the created data stream to include "purple" (i.e., an average of "blue" and "red") as the color information for the "middle" display element. Image reductions may be similarly improved by the dithering/blending function. Furthermore, the dithering/blending function may take into account both horizontal and vertical scaling factors and apply interpolation schemes in addition to simple averaging.

In the case of the display area portion filling the display screen, the full-screen data stream is created from the derived color information. For example, if display element J8 is included in the display area portion and at least one of the scaling factors is 2, the full-screen display data stream contains at least two pieces of color information derived from the color information provided in the display memory portion for display element J8.

The full-screen display data stream represents a full-screen version of the display area portion, i.e., the full-screen display data stream includes color information for every display element in the display screen (here, for display elements A1/A26/T1/T26). In addition, the full-screen display data stream is updated in real-time as the display memory portion is updated. Thus, in the example, if the operating system or the application program causes frequent changes (e.g., 30 changes per second) in the stored color information for display element J8, the full-screen display data stream includes respective changes at the same frequency.

The full-screen display data stream is channeled by the multiplexor control logic through the multiplexor unit to the DAC, which in real-time produces display signals suitable for producing the full-screen display version on the display screen (step 1060). In particular, the display signals are analog signals in which the color information from the full-screen display data stream is encoded.

Figure 6:
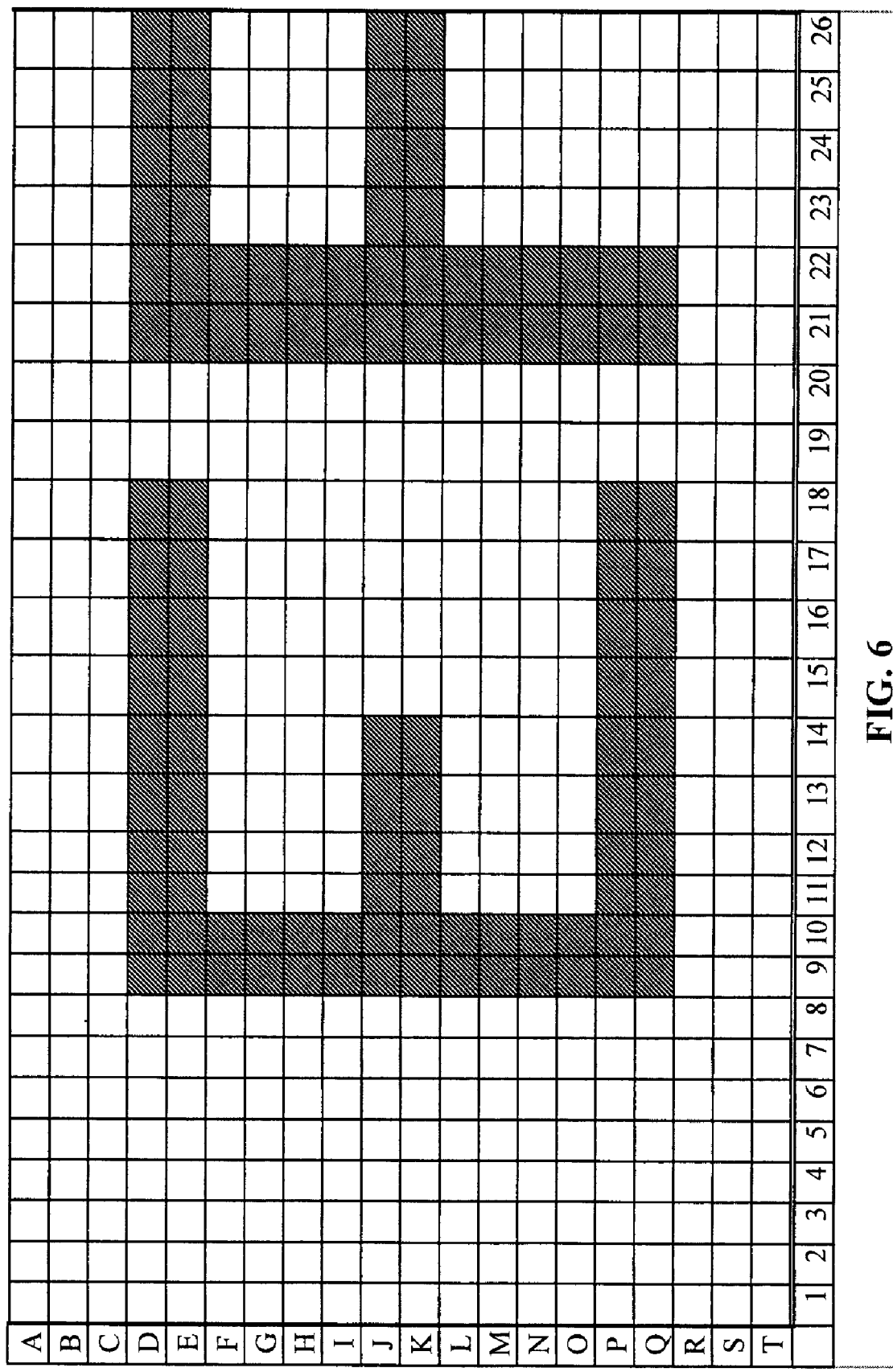
Figure 7:
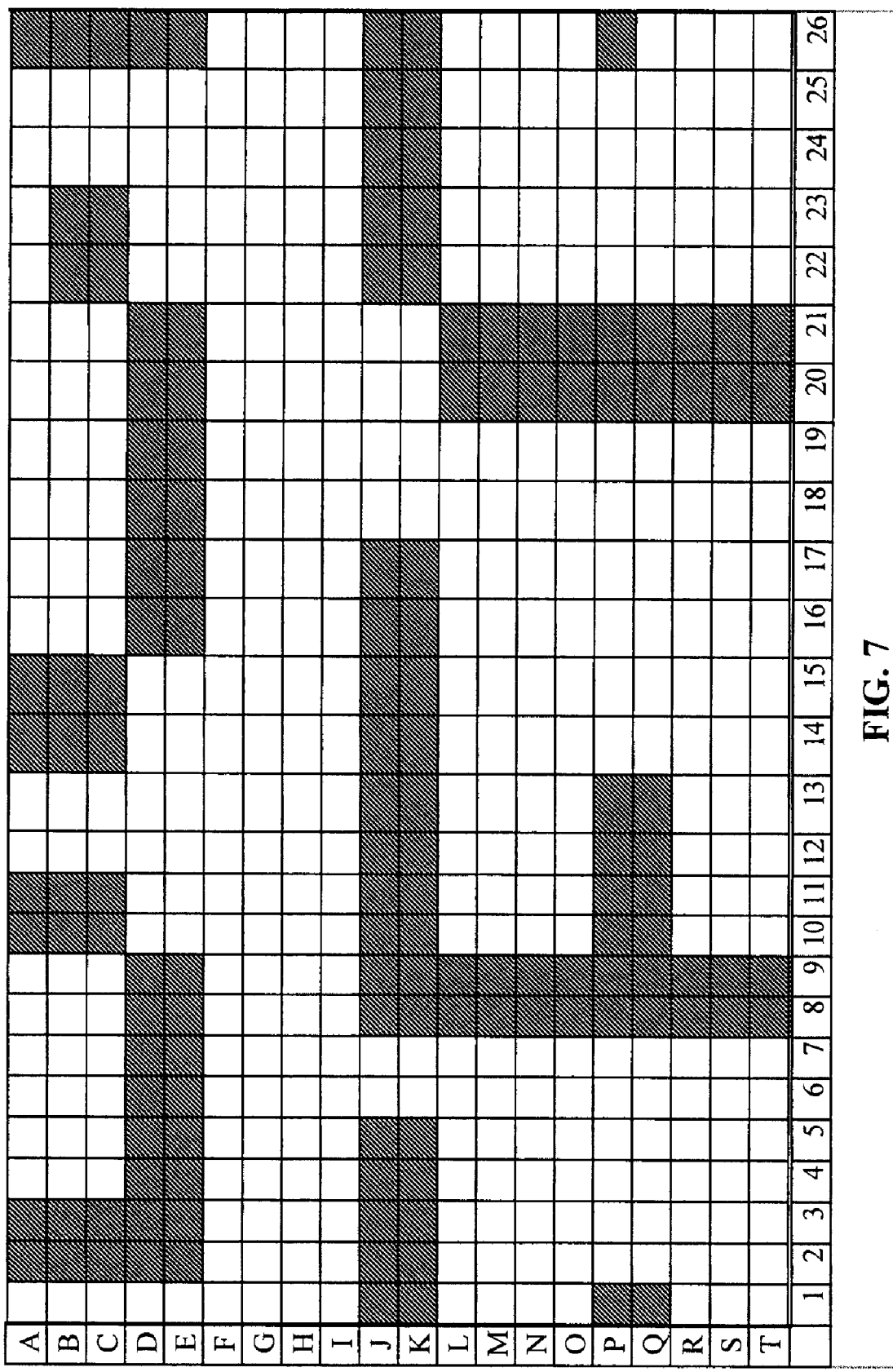

FIG. 6 illustrates a visual display produced from the display signals by the computer monitor (step 1070). The visual display is based on a filling of the display screen with a properly proportioned display area portion based on the capital letter "E" image of FIG. 3, if the pointer position corresponds to display element M6, the horizontal scaling factor is 2, and the vertical scaling factor is 2. In such a case, the image scaler reads color information from a display memory portion corresponding to the "E"-based display area portion (i.e., color information for display elements H1/H12/R1/R12) to produce the full-screen display data stream. Consequently, for example, the display memory portion's color information for display element J8 is duplicated by the image scaler for the display screen controller to use for four display elements: D17, D18, E17, E18. Similarly, the display memory portion's color information for display element N5 is duplicated by the image scaler for the display screen controller to use for four other display elements: L11, L12, M11, M12. The full-screen enlargement visual display of FIG. 6 is centered around display element MG (FIG. 3) because the pointer position corresponded to display element MG at the time that the display driver determined that scaling was necessary.

Figure 5:
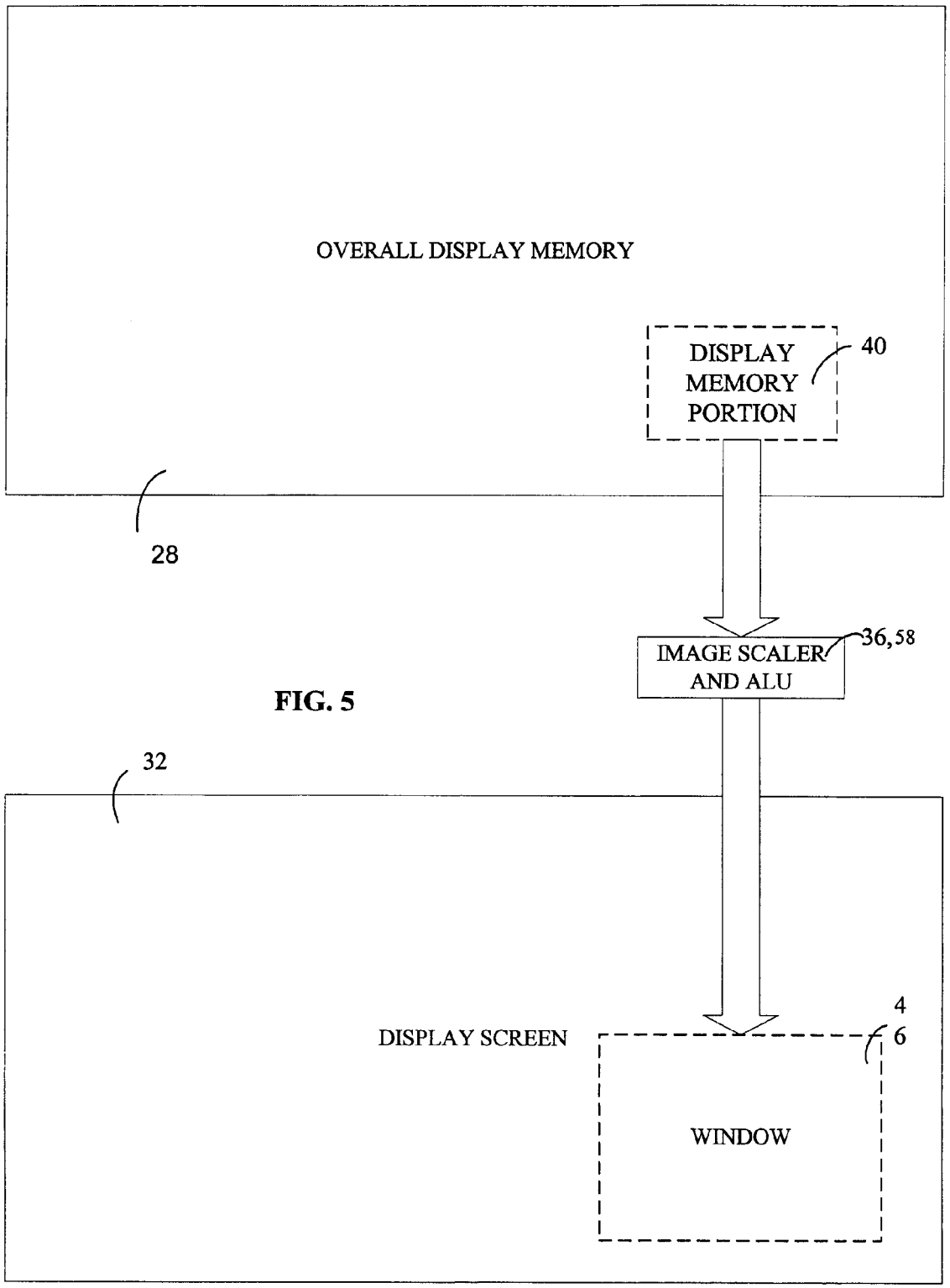

If the display area portion is not to be enlarged to fill the display screen (step 1030), e.g., if the predetermined combination includes the "control" key, the "alt" key, and the "F10" key as noted above, the display area portion is to appear as a window 46 (FIG. 5) overlaid atop the visual display of FIG. 3. The display driver determines the horizontal and vertical scaling factors (as described before for step 1040), and a scaled display location for the display area portion, i.e., for the window (step 1080). Like the scaling factors, the scaled display location may be determined in any of a number of ways. For example, the end-user may pre-select a setting that causes the scaled display location to correspond to one of the four corners of the display screen. Or the display driver may be set to determine the scaled display location based on the pointer position, to ensure that the window is overlaid atop the display area portion itself.

The image scaler and the scaling factors are then used to derive from the display memory portion a scaled display data stream (taking the place of the full-screen data stream 44 in FIG. 1) that represents a scaled version of the display area portion and that is updated in real-time as the display memory portion is updated (step 1090). The scaled display data stream is much like the full-screen display data stream (described above in connection with step 1050), except that the scaled display data stream represents the scaled version, not the full-screen version. In the case of a scaling factor of less than one, the scaled version is in fact a reduced version. As described above, the image scaler may produce color information for the reduced version by leaving out of the scaled display data stream some of the color information from the display memory portion. For example, if the horizontal scaling factor is 0.5, the reduced version is only half as wide as the display area portion and the scaled display data stream may include color information for only every other column of display elements in the display area portion. Also, the reduced version of the image may be improved by the dithering/blending function of the image scaler, as described above.

The display screen controller derives from the overall display memory an unscaled display data stream 44 (FIG. 1) that represents at least another subset (e.g., the overall display area or the overall display area less the display area portion) of the overall display area and that is updated in real-time as the overall display memory is updated (step 1100). The unscaled display data stream carries neither duplicates of color information nor leaves out color information for the purpose of an image reduction.

In real-time, based on the scaled display location, the scaled display data stream, and the unscaled display data stream, the DAC produces display signals suitable for producing on the display screen an amalgam of the scaled version and at least the subset of the overall display area (i.e., for producing on the display screen a combination visual display) (step 1110). The DAC is able to produce such signals because the multiplexor control logic directs the multiplexor unit to switch between passing the scaled display data stream and passing the unscaled display data stream, as described in an example below.

Figure 8:
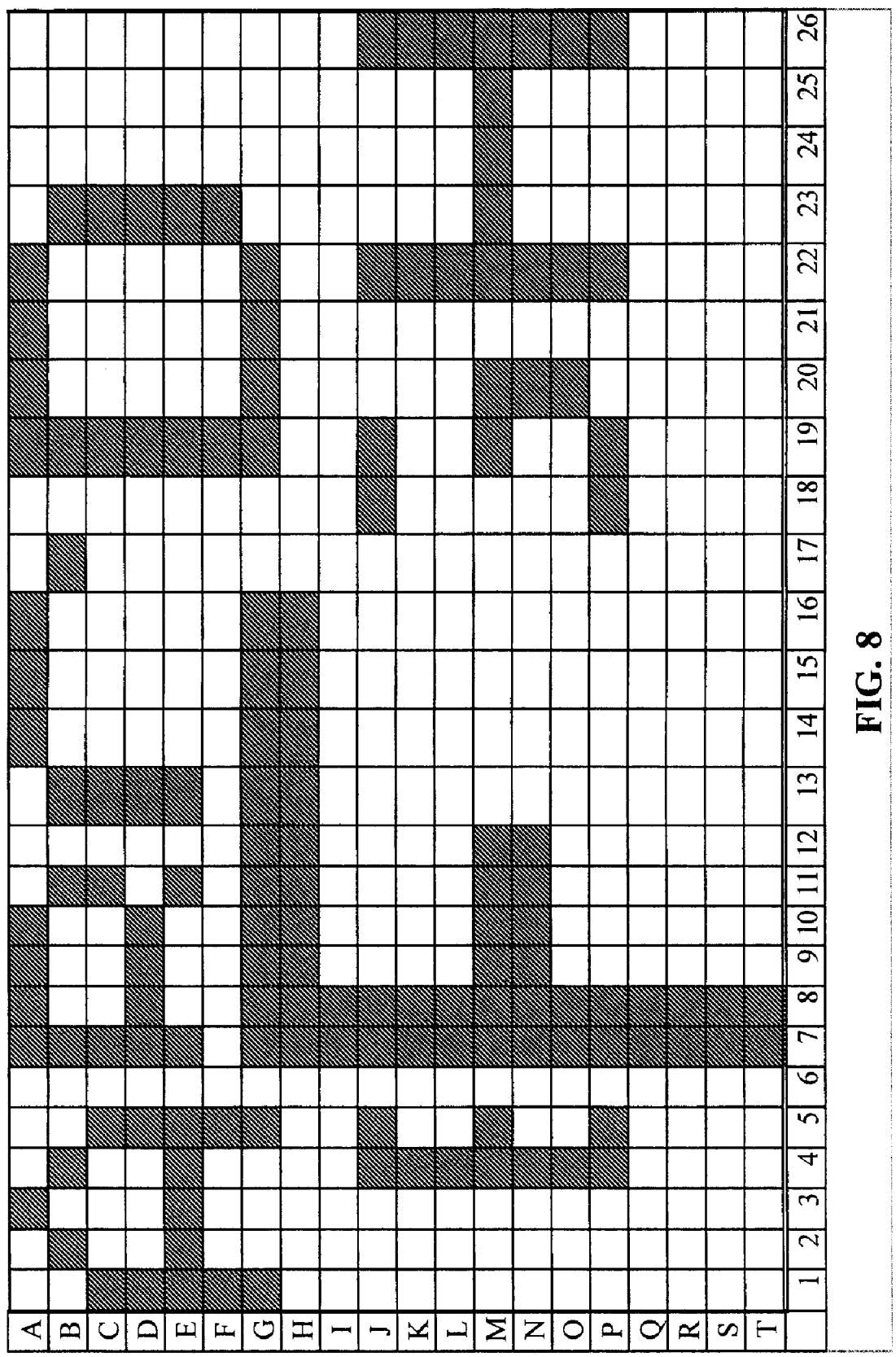

The display signals are then used to produce the visual display on the display screen, as described above (step 1070). FIG. 8 illustrates an example of such a visual display, which is the same as the visual display of FIG. 3, except that the image "F" (i.e., a set of display elements J10/J14/P10/P14 of FIG. 3) has been enlarged in a window that has a one-display-element border and uses a vertical scaling factor of 2 and a horizontal scaling factor of 2. In the example, the window is positioned as shown in FIG. 8 because the pointer position corresponded to display element M12 at the time it was determined that scaling was needed. Thus, the window is centered around display element M12.

Regardless of whether the display area portion is to fill the display screen, the display driver can remove the scaled image instantly, by directing the multiplexor control logic to set the multiplexor unit to pass only the unscaled display data stream. Such a setting allows the DAC to function normally using the overall display memory, which was left unchanged by the image scaler. For example, such a direction causes the display screen to return immediately to displaying the visual display of FIG. 3.

Figure 10:
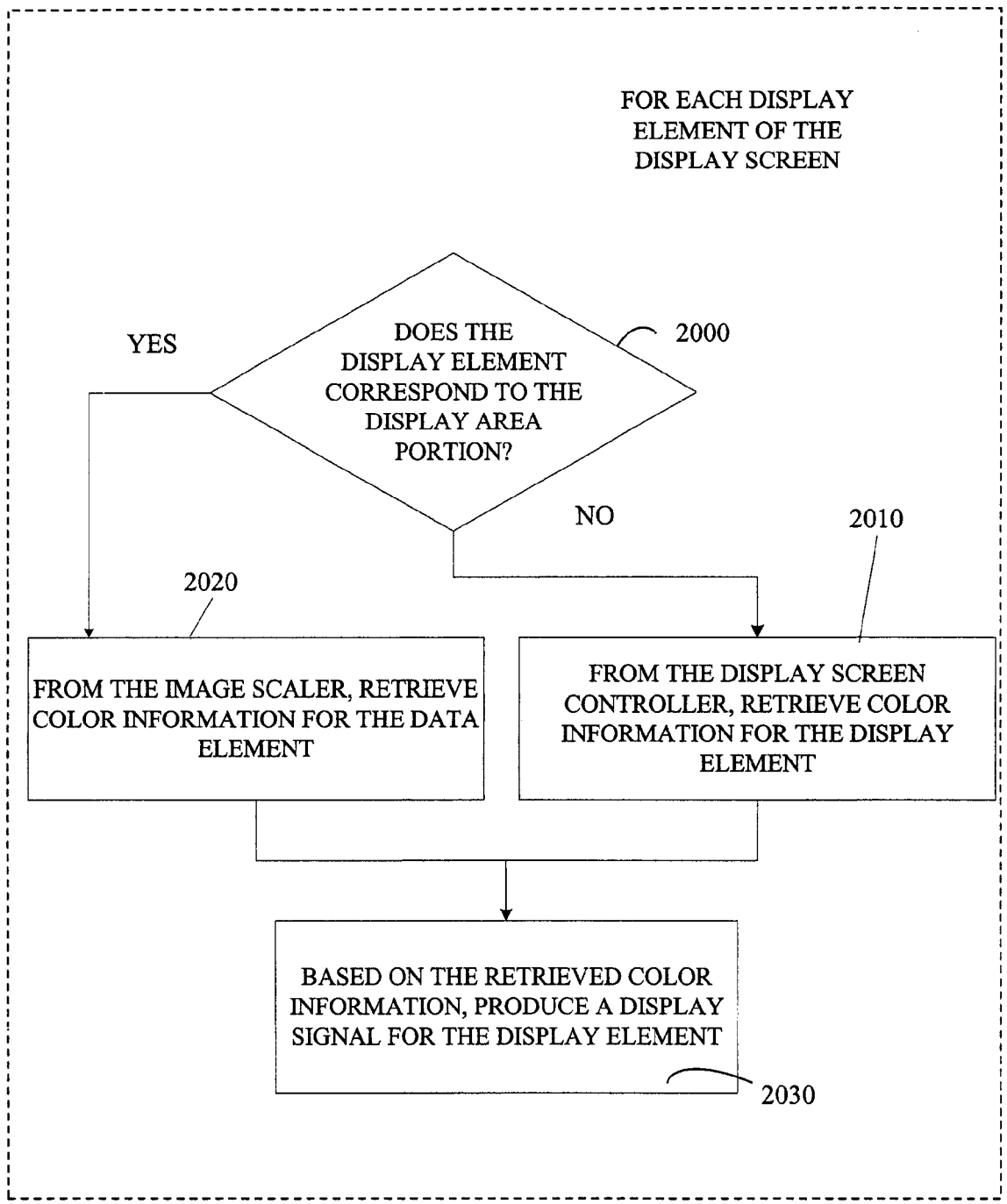
Figure 11:
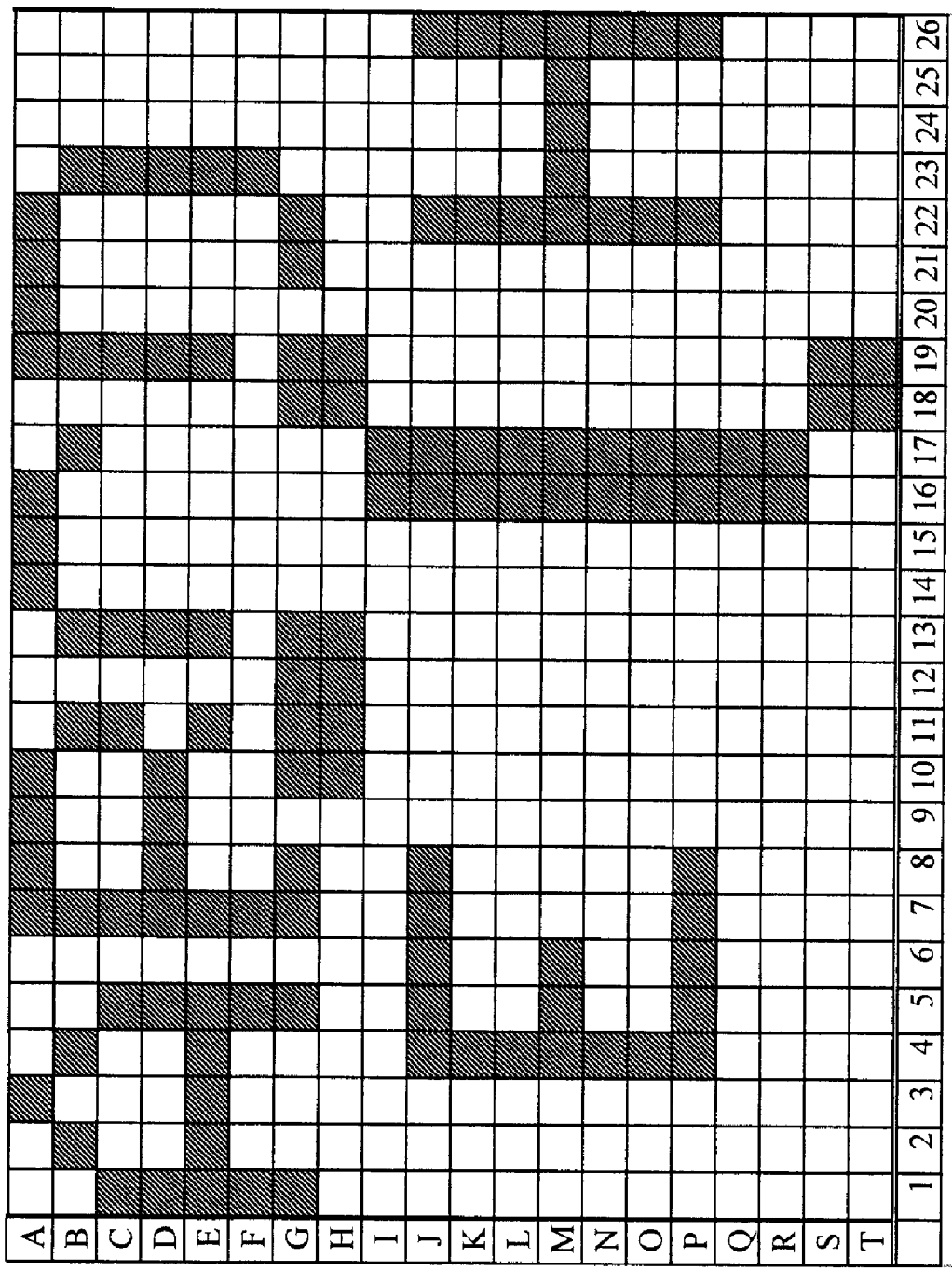

FIG. 10 illustrates a procedure used by the multiplexor control logic, multiplexor unit, and DAC to produce for each display element (in our example, for each of the display elements A1/A26/T1/T26 in FIG. 8) one of the display signals described above in connection with step 1110. First, the multiplexor control logic determines whether the display element corresponds to the display area portion (in our example, whether the display element is in the set of display elements J10/J14/P10/Pl4 of FIG. 3) (step 2000). If the display element does not correspond to the display area portion, the multiplexor unit is set so that the color information for the display element is retrieved from the display screen controller (i.e., from the unscaled display data stream) (step 2010). Such is the case, for example, for display element J5 of FIG. 8. On the other hand, if the display element does correspond to the display area portion, the multiplexor unit is set so that the color information for the display element is retrieved from the image scaler (i.e., from the scaled display data stream) (step 2020). Such is the case, for example, for display element J6 of FIG. 8. Regardless of the source of the color information, the DAC then produces for the display element the one of the display signals (step 2030).

In particular, the display signals are produced sequentially from left to right with respect to the display elements. Thus, for such a computer monitor having the visual display of FIG. 8, while the DAC is producing display signals for the display elements of Row J, the multiplexor unit switches from passing the unscaled display data stream for display element J5 to passing the scaled display data stream for display element J7. From the perspective of the display screen (e.g., the computer monitor noted above), the switch is of no consequence, because the display screen is indifferent to the method of generation of the display signals in general and to the source of the color information in particular.

The ALU of the multiplexor unit allows the contents of one of the display data streams to be used as an additional basis for switching between the display data streams. For instance, the ALU may provide a masking function, by causing the multiplexor to pass the scaled display data stream only when the unscaled display data stream specifies a particular color. In a particular example, the unscaled display data stream may define on the display screen a rectangle in which text is displayed in white on a blue background. If so, the ALU may be set to allow the scaled display data stream to pass only when the unscaled display data stream is providing color information for the blue background. As a result of such a setting, white text is displayed over the scaled image in the rectangle, much as an image of a weather reporter is displayed over an image of a weather map on a television news program.

Figure 9:
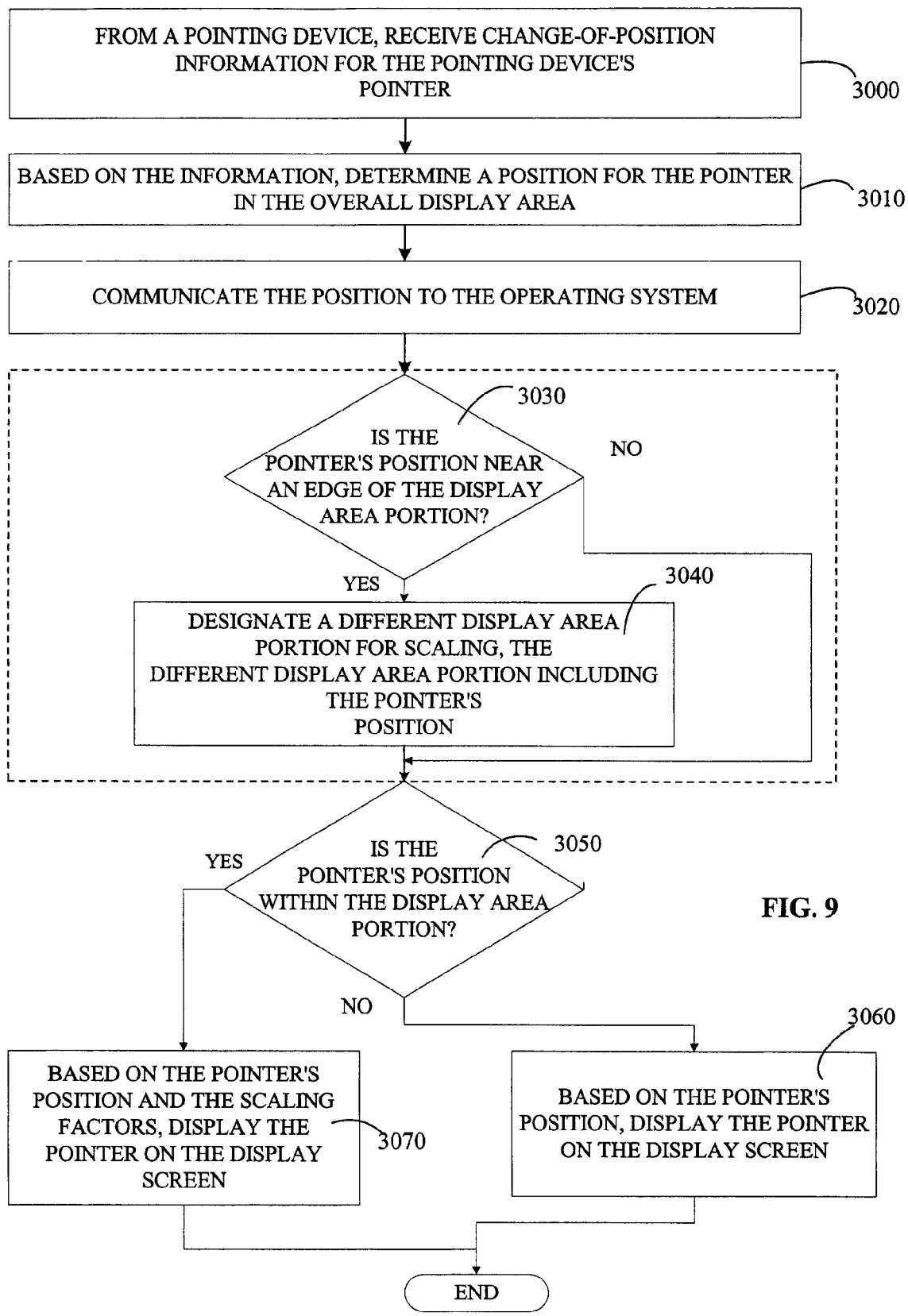

FIG. 9 illustrates a procedure defining relationships between the pointing device and the scaling. When the pointing device is moved by the end-user, the pointing device sends to the pointing device driver input signals constituting change-of-position information for the pointing device's pointer (step 3000). For example, the change-of-position information may indicate that the pointer position should be changed from its current position at one display element to another position at another display element that is three display elements to the right.

This change-of-position information is intercepted and provided to the display driver by the input interception program. Based on the information, the display driver determines a position for the pointer in the overall display area (step 3010). For example, with reference to FIGS. 3 and 8, the current position for the pointer may correspond to display element G5 in both the overall display area represented by FIG. 3 and the visual display represented by FIG. 8. However, if the change-of-position information indicates that the pointer position should change three display elements to the right as described above, the pointer position on the visual display ("the visual pointer position") and the pointer position in the overall display area ("the logical pointer position") become different. The visual pointer position corresponds to display element G8 (FIG. 8), which is as the end-user expects from moving the pointing device an amount corresponding to three display elements. The logical pointer position, on the other hand, is determined according to the source of the color information for display element G8, i.e., is mapped to the source of color information. Thus, because the color information for display element G8 (FIG. 8) is retrieved from a memory element having color information for display element J10 (FIG. 3), the logical pointer position is determined to correspond to display element J10 (FIG. 3).

Similarly, if the display area portion is to fill the display screen (for example as shown in FIG. 6), the logical pointer position is mapped according to the source of the color information. For example, with reference to FIG. 6, if the change-of-position information causes the visual pointer position to correspond to display element Q17 (FIG. 6), the logical pointer position is determined to correspond to display element P8 (FIG. 3).

The logical pointer position is communicated to the operating system (step 3020). As a result, the operating system and the application program are able to execute as expected by the end-user. For example, with reference to FIGS. 3 and 8, the application program may be a word processing program that causes the overall display memory to have the color information for the original visual display of FIG. 3 and the amalgam visual display of FIG. 8. In addition, the word processing program may provide a feature wherein a capital letter (i.e., one of the capital letter images "A" through "H") selected by the end-user is highlighted, i.e., color information is changed for the selected capital letter's display elements. The end-user may be able to make such a selection by positioning the pointer over the capital letter and pressing a button provided by the pointing device, e.g., double-clicking a mouse button. Presented with the visual display of FIG. 8, the end-user may position the pointer over display element G8 (corresponding to the visual pointer position) and make the selection of the capital letter "F", which appears enlarged in the window. Because (in accordance with the principles described above), the logical pointer position then corresponds to display element J10, the word processing program is able to detect the selection of the capital letter "F". Consequently, the word processing program causes changes to the color information for display elements J10/J14/P10/P14, which causes the enlarged capital letter "F" (FIG. 8) to appear highlighted (in real-time via the image scaler) as the end-user expects.

FIGS. 3, 6, 7, 8, 11 also illustrate an example of another factor that can cause the display driver to determine that scaling is necessary (see the discussion above for step 1010). The display driver may determine whether the visual pointer position is near an edge of the display area portion (i.e., near an edge of the display screen in the case of the display area portion filling the display screen or an edge of the window otherwise) (step 3030, FIG. 9). If so, the display driver may designate a different display area portion for scaling so that the different display area portion includes the logical pointer position (step 3040). For example, in the case of the display area portion (display elements H1/H12/R1/R12 in FIG. 3) filling the display screen (all the display elements in FIG. 6), the end-user may cause the visual pointer position to move to the right with respect to display element D26 (FIG. 6). If so, the display driver designates a different display area portion (display elements E6/06/E19/019) for scaling, resulting in the visual display shown in FIG. 7. Note that the different display area portion is centered around the logical pointer position corresponding to display element J13 (FIG. 3). Such a logical pointer position is used because this logical pointer position corresponds to a point to the right with respect to display element D26 (FIG. 6) of the original display area.

Similarly, for example, in the case of the display area portion (J10/J14/P10/P14 in FIG. 3) filling only a window (display elements F7/F17/T7/T17 in FIG. 8) of the display screen, the end-user may cause the visual pointer position to move to the right with respect to display element M16 (FIG. 8). If so, the display driver designates a different display area portion (display elements J13/J17/P13/P17) for scaling, resulting in the visual display shown in FIG. 11. Again, the different display portion is centered around the logical pointer position.

Regardless of whether the display driver designates a different display area portion based on the pointer position being near the edge, the display driver then determines whether the logical pointer position corresponds to the display area portion currently being used for scaling (step 3050). If not, the pointer is displayed on the screen based on the logical pointer position (step 3060). For example, with reference to FIG. 8, if the logical pointer position corresponds to display element G5, the pointer is displayed with a visual pointer position of G5.

On the other hand, if the logical pointer position does correspond to the display area portion currently being used for scaling, the pointer is displayed on the screen based on not only the logical pointer position but also on the scaling factors (step 3070). For example, if the logical pointer position corresponds to display element J14 (FIG. 3), the horizontal scaling factor is used to derive a visual pointer position of G15, G16, H15, or H16, depending on the configuration of the display driver.

The overall display memory and the integrated controller may be provided on computer plug-in circuit board card compatible with the PCI standard or another standard such as ISA. Alternatively, the overall display memory or the integrated controller, or both, may be provided elsewhere, such as on a mainboard of the computer system. Similarly, one or more parts (such as the DAC or the multiplexor unit) of the integrated controller may be provided on the plug-in card or elsewhere.

The display screen may include any display able to be updated in real-time, such as a computer monitor using, e.g., cathode-ray tube technology, liquid crystal display technology, or gas-plasma technology. In the case of a computer monitor using technology other than cathode-ray tube technology, at least the DAC may be replaced with circuitry suitable for producing display signals (such as a digital display signals) compatible with the computer monitor.

The image scaler may be based on a general-purpose computer processor that executes computer instructions. The computer instructions may be stored in a memory in the manner of firmware, or may be stored elsewhere and made available to the computer processor (i.e., "downloaded") prior to use. Alternatively, the image scaler may be based on a special-purpose logic circuit such as a gate-array circuit or an application-specific integrated circuit ("ASIC").

Similarly, the display screen controller may be based on a general-purpose computer processor or a special-purpose logic circuit.

Other embodiments are within the scope of the following claims. For example, the image scaler may be used with a display area portion of any shape, such as a circle, a polygon, or an ellipse. In the case of an image reduction, the display area portion may constitute the entire overall display area.

The pointing device's pointer may be generated for display in a number of ways. For instance, the pointer may be generated by the operating system which causes changes to memory elements in the overall display memory so that the pointer appears on the display screen when the DAC produces the display signals based on the color information in the overall display memory. In such a case (involving a "software pointer"), during scaling of the display area portion, the display driver may cause the software pointer to be replaced based on the change-of-position information.

What is claimed is:

1. A method for displaying an image comprising both an unscaled portion and a scaled portion, the method comprising:
   storing in an unscaled display memory, original image data representing an original version of the image;
   receiving a scaling indicator when at least a portion of the image is to be scaled, wherein the scaling indicator indicates a scaling factor and a scaled display area location of a resulting scaled image;
   retrieving a portion of the original image data from the unscaled display memory, the portion being a subset of the original image data;
   scaling, based on the scaling factor, the portion of the original image data to produce scaled display data;
   retrieving an unscaled display data from the unscaled display memory, the unscaled display portion being another subset of the original image data; and
   providing the scaled display data for display in the scaled display area location and the unscaled display data in the unscaled portion of the image without changing the contents of unscaled display memory and wherein the image contains a plurality of subsets of the original image data.

2. The method of claim 1 further comprises:
   when the display area location equates to an entire display:
      selecting the scaled display data when rendering the image.

3. The method of claim 1, wherein the scaled display data represents an enlarged version of the image or a reduced version of the image.

4. The method of claim 1, wherein the scaling factor further comprises a horizontal scaling factor that is different from a vertical scaling factor.

5. A device for use with a display screen, the device comprising:
   a memory interface operably coupled to retrieve data representing an original version of an image from display memory, the display memory comprising data for display on an original image location area of the display screen;
   a controller operably coupled to receive a scaling indicator, wherein the scaling indicator indicates a scaling factor and scaled display location area for a resulting scaled image, wherein the controller generates a control signal based on the scaled display location area, the scaled display location area being a subset of the original image location area;
   an image scaler connected to receive the data representing the original version of the image and to produce a data stream representing the resulting scaled image, wherein the resulting scaled image includes at least a portion of the original version of the image;
   a display screen controller operably coupled to receive the data representing the original image and to produce therefrom a data stream representing the original image; and
   multiplexor operably coupled to receive the data stream representing the resulting scaled image, the data stream representing the original image, and the control signal, wherein the multiplexor passes the data stream representing the resulting scaled image for display on the display screen when the control signal indicated that the display location area is being rendered and passes the data stream representing the original image when the control signal indicates that the display location area is not being rendered such that the resulting scaled image comprises a subset of the original image on the display screen, the data stream representing the resulting scaled image only containing the scaled image and the data stream representing the original image only containing the original image or the original image less the scaled display location.

6. The device of claim 5, further comprises a digital-to-analog converter operably coupled to receive the data stream representing the image and the data stream representing the resulting scaled image and to produce therefrom analog display signals.

7. The device of claim 5, wherein the memory interface further comprises an interface for receiving an updated version of the image and to store the updated version in the display memory, wherein the updated version is provided to the image scale, and wherein the image scaler scales the updated version to produce the data stream representing the resulting scaled image.

8. The device of claim 5, wherein the control signal further comprises an indication that the entire display screen is to be filled with the resulting scaled image.

9. The device of claim 5, further comprises an arithmetic logic unit connected to affect the passing of the data stream representing the resulting scaled image by dithering color information of the data stream representing the resulting scaled image.

10. The device of claim 5, wherein the image scaler is configured to use horizontal and vertical scaling factors.

11. The device of claim 10 wherein the horizontal scaling factor is different from the vertical scaling factor.

* * * * *